Figure 1:
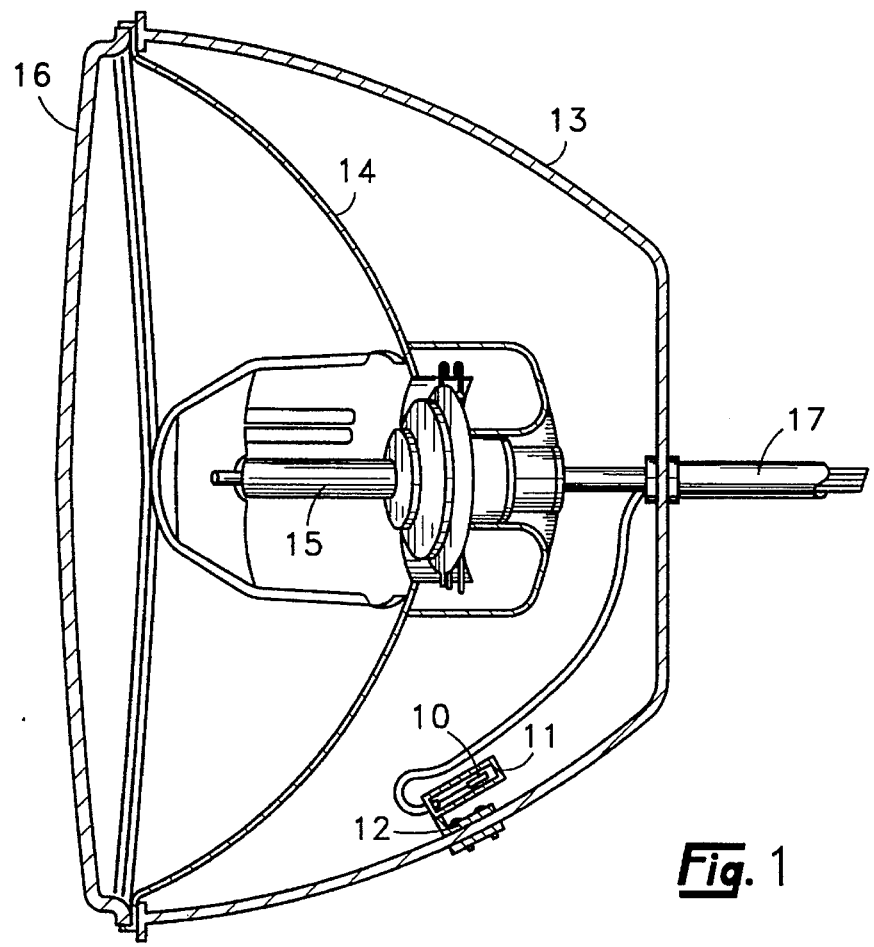

United States Patent [19]

Trolle

[11] Patent Number: 5,493,908
[45] Date of Patent: Feb. 27, 1996

[54] METHOD AND DEVICE FOR ENCASING SENSORS ADAPTED TO SENSE THE POSITION OR THE MOVEMENTS OF A VEHICLE

[75] Inventor: Sten Trolle, Ystad, Sweden

[73] Assignee: Solaris Nova Aktiebolag, Ystad, Sweden

[21] Appl. No.: 211,040

[22] PCT Filed: Sep. 16, 1992

[86] PCT No.: PCT/SE92/00634

§ 371 Date: Jul. 25, 1994

§ 102(e) Date: Jul. 25, 1994

[87] PCT Pub. No.: WO93/06490

PCT Pub. Date: Apr. 1, 1993

[30] Foreign Application Priority Data

Sep. 16, 1991 [SE] Sweden ................................ 9102660

[51] Int. Cl.⁶ .................................................... G01P 3/26
[52] U.S. Cl. ............................................................ 73/493
[58] Field of Search ............................ 73/431, 493, 517 R; 313/323, 324; 248/542, 27.1

[56] References Cited

U.S. PATENT DOCUMENTS

| | | | |
|---|---|---|---|
| 4,224,551 | 9/1980 | Liebegott | 313/324 |
| 4,328,706 | 5/1982 | Akita et al. | 73/493 |
| 4,926,170 | 5/1990 | Beggs et al. | 340/904 |
| 5,038,613 | 8/1991 | Takenaka et al. | 73/493 |
| 5,233,871 | 8/1993 | Schwarz et al. | 73/493 |

*Primary Examiner*—R. Raevis
*Attorney, Agent, or Firm*—Luedeka, Neely, Graham & Neely

[57] ABSTRACT

A sensor element, such as an accelerometer, for sensing the position and/or the movements of a vehicle body is protected by a device comprising at least two protective casings. An inner casing encloses the sensor and protects the sensor against at least contamination. At least one outer casing encloses the inner casing and sensor and further protects the sensor against at least mechanical damage and shock. The at least one outer casing is a vehicle light casing, such as a headlight or tail light casing.

7 Claims, 1 Drawing Sheet

METHOD AND DEVICE FOR ENCASING SENSORS ADAPTED TO SENSE THE POSITION OR THE MOVEMENTS OF A VEHICLE

The present invention relates to sensors for sensing the position and/or the movements of a vehicle or a vehicle body.

In the last ten years or so, use has been made of so-called active suspension, which is a system radically improving the performance of the vehicle, especially its road-holding qualities, by altering the parameters controlling the movements of the vehicle suspension and represented by the stiffness of the suspension and the dampening effect produced by the dampers to reduce the risk of oscillations occurring in the suspension.

This suspension system has been rendered more sophisticated by the active supply of energy therein, e.g. in order to incline the vehicle for purposes of compensation in a "motorcycle-type fashion" in the bends. Similar ideas have been implemented for high-speed trains, where the carriage body is inclined inwards towards the center of a movement through a curve. Such inclination of the vehicle body substantially improves the road performance as well as the riding comfort of the driver and the passengers, manifesting itself not only as a potentiality of increased average cruising speed but also as a safer travelling function and improved braking properties of the vehicle.

From the theoretical, mathematical point of view, it has been held that the position of a vehicle is best determined with the aid of an inertial-navigation system with a so-called sky-hook, in which the position of the car in space can be determined. However, since such systems are extremely expensive as well as complicated to build, efforts have instead been made to measure the total movements of the car body to get an idea of the various movements that may arise, such as rocking, rolling, and vertical displacement of the center of gravity. When using this system, it is of extreme importance that these movements be determined with the utmost accuracy.

To this end, use is made of accelerometers, which are arranged at different points in the vehicle. In a simple acceleration system, the accelerometer is disposed at the center of mass of the vehicle. In more advanced systems, on the other hand, the accelerometers are disposed as peripherally as possible in the vehicle to give maximal deflection when the car body moves in certain patterns. In this context, the maximal forces of acceleration are in the order of 2 g. In terms of construction, it is not very difficult to build an accelerometer having a maximal output signal as early as 2 g. However, the demands of the car industry are much higher. Thus, they require that an accelerometer should be able to withstand a fall to a concrete floor from a height of 1 m. Accelerations of about 5000 g have been measured on such impacts, and it is regarded as difficult to build accelerometers withstanding an optional shock of 5000 g while maintaining their properties at ±2 g. Today's accelerometers are thus built with several protective casings, where the innermost casing encloses the accelerometer and its seals, and the outermost casing is made of, e.g. hard rubber or some other yielding material giving a certain deceleration distance, should the accelerometer be exposed to extreme shocks.

This problem is the more complicated as it is impossible to determine by visual inspection or a simple measuring operation whether an accelerometer has been damaged, e.g. during transport or when being mounted.

Another problem encountered in prior-art constructions concerns the positions of the accelerometers in the vehicle. Naturally, accelerometers can be arranged in, e.g. the luggage boot, but it is much more difficult to find a suitable place in the front of the vehicle. The engine compartment is regarded as one of the most difficult places for electrical equipment. This is so because one then has to take into consideration not only temperatures ranging up to 120° C., but also the risk of chemical damage, e.g. from degreasing agents, oil, or water. In addition, the environment is extremely exacting also because of electrical conditions, since high voltages of up to 20,000 V will be mingled with signalling voltages.

In the light of these facts, one has had to equip the sensors arranged in different places in the vehicle with special protective electronics as well as an extremely environment-resistant casing, to protect the sensors from chemicals, high temperatures, and moisture migration through contacts.

The accelerometers manufactured for the car industry are often so encased that they are, in appearance and shape, suggestive of relays or spark plugs. The assembly personnel may therefore easily come to regard accelerometers as being equally resistant as spark plugs or relays.

Thus, one may conclude that it is today possible to mount accelerometers wherever one wishes in the vehicle, but this involves extremely high requirements on the environmental resistance of the accelerometers with regard to multi-layer casings as well as the resistance to chemicals and temperature. In addition, the accelerometer has to be extremely impact-resistant and also so designed that it cannot be incorrectly mounted. If the accelerometer is incorrectly mounted, it will emit completely false output signals. All in all, special demands thus have to be placed either on the design of the accelerometer or on the fitter. Both of these requirements have proven difficult to meet.

There is a general trend within the car industry towards looking for solutions where the amount of cabling is reduced. In today's cars, cabling stands for one of the highest individual costs. It is therefore of particular interest to find assembly systems minimizing the amount of cabling. When new auxiliary systems, such as active suspension, are introduced, the amount of cabling increases considerably.

The car industry has reacted to this by gathering the functions of, e.g. the steering column components or the door components, such as locks, rear view mirrors and window lifts, in a submodule containing a microprocessor. This processor will in turn transmit and process the signals from various peripheral units. These signals will then be transmitted on a common bus system to a central computer, where the information can be further processed and whence it is transmitted to various setting means.

An object of the present invention is to reduce or obviate the above problems while enabling less expensive production of interfaces with regard to the remaining electronics.

Many of the above demands and requirements are met if the sensor or the acceleration transducer is provided with a weatherproof and impact-resistant casing which cannot be incorrectly mounted and is disposed at each corner of the car and which preferably may be used also for other functions. Despite all these features and requirements being well-known, the solution to the above problems has not been obvious to the expert. If, as in the present invention, the requirements for the accelerometer are combined with the requirements for other functions of the vehicle, these problems may be solved in a surprisingly simple way.

Thus, the invention is based on the fact that, in modern cars, the parking lights, the blinkers, the brake lights and the tail lights are mounted in a casing which in turn is arranged at one of the four corners of the car. In some cases, this also goes for the main headlights. These indicators or information transducers are so constructed that it is impossible to confuse them, either in respect of design or in respect of mounting location and orientation. The indicators are designed so as to be able to withstand an environment at the boundary surface between "outside the car" and "inside the car", which means that they are extremely moisture-resistant as well as resistant to various types of chemical and mechanical strain. If an accelerometer is also arranged in the same casing, as in the invention, it can be mounted at a marginal cost in a protected fashion during the very assembly of the indicators or information transducers in the factory. In this instance, the outer casing is composed of the outer casing of the indicator, while the electric connections largely may run in parallel with the other electric connections of the indicator.

Thus, the invention relates to a method for protecting a sensor, as defined in appended claim 1. In this method for protecting a sensor element, such as an accelerometer, adapted to sense the position and/or the movements of a vehicle body, the sensor element is thus enclosed by at least two protective casings providing protection against, respectively, contamination and mechanical damage and shocks, said protective casings being designed as an inner casing which in turn is enclosed by an outer casing. The method according to the invention is characterized in that the outer protective casing is designed as at least a portion of a cover for a lighting device or an information transducer.

Expressed in another way, the inventive method resides in enclosing the sensor element by a protective casing providing protection against contamination, mechanical damage and shocks. This aspect is distinguised by the protective casing being designed as an inner casing which in turn is enclosed by an outer casing designed as at least a portion of a cover for a lighting device or an information transducer for the vehicle.

The invention further concerns a device for protecting a sensor, as defined in appended claim 2. In this device for protecting a sensor element, such as an accelerometer, adapted to sense the position and/or the movements of a vehicle body, the sensor element is thus enclosed by at least two protective casings which are designed as an inner casing protecting the sensor element against contamination, and an outer casing protecting the sensor element against mechanical damage and shocks. The device of the invention is characterized in that the outer protective casing is designed as at least a portion of a cover for a lighting device or an information transducer.

Expressed in another way, the inventive device serving to protect the sensor element comprises at least two protective casings, of which at least one provides protection against contamination, and at least one provides protection against mechanical damage and shocks. According to the invention, this device is characterized in that one of the protective casings is designed as at least a portion of a cover for a lighting device or an information transducer to fellow road-users. In this instance, the sensor element can be disposed in a protective casing designed to provide protection against contamination and itself arranged in a cover providing protection against mechanical damage and shocks and serving as a cover for a lighting device and/or information transducer of the vehicle. According to the invention, the sensor element and the lighting device and/or information transducer of the vehicle may be connected to a common microprocessor or computer.

According to the invention, the cabling of the sensor may thus be combined with that of other components in the outer protective casing. In systems utilizing a signal-bus cable, a sensor encased according to the inventive method or a sensor arranged in accordance with the invention, can constitute a submodule where information is also derived from the sensor element (the accelerometer). Naturally, the accelerometer may also be designed so as to be easily mountable in the casing of the indicator by means of special contacts. In that case, the accelerometer would be as easy to replace as the lamps used in the indicator.

Figure 2:
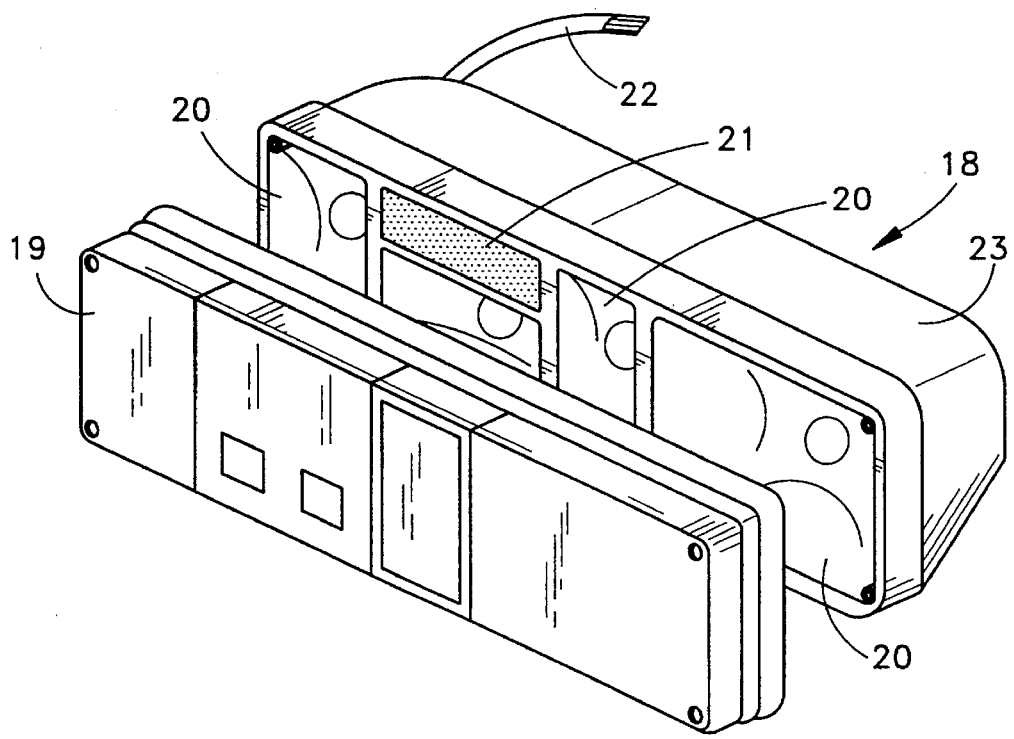

The invention will be described in more detail below with reference to the accompanying drawing, in which FIG. 1 illustrates a headlight in which is incorporated an accelerometer, and FIG. 2 illustrates an indicator unit containing brake lights, position lights and an accelerometer according to the invention.

In the invention, an accelerometer 10 is disposed in an inner casing 11 which provides protection against dust and mechanical damage and which is mounted in the interior of a headlight casing 13 by fastening means 12. In conventional manner, this headlight casing 13 is made of a yielding material, such as plastics material, and contains a reflector 14 and a lamp unit 15. The entire arrangement is covered by a lamp glass 16. With this construction, the degree of sealing is high. The accelerometer 10 and the lamp unit 15 have a cable bundle 17 connected to the electric system of the vehicle.

FIG. 2 illustrates a tail-light unit 18 comprising a lamp glass 19 and a frame 23. Reflectors 20 for different types of lamps are provided in the frame. In accordance with the invention, a sensor 21 is further disposed in a protective casing which is impact-resistant as well as resistant to other types of mechanical damage. As in FIG. 1, the various lamps and also the accelerometer are connected to the electric system of the vehicle by a cable bundle 22.

To further improve the impact- and shock-resistance, the fastening means 12 may be yielding, or an additional protective casing, e.g. of cellular plastic or cellular rubber, can be used in the arrangement.

By mounting, in accordance with the invention, a comparatively shock-sensitive sensor (may withstand a maximum of some 200 g) in an outer yielding casing, e.g. of plastics, one automatically obtains a deceleration distance by elastic deformation, should the entire arrangement (of FIGS. 1 and 2) be dropped on the floor. Only insignificant deformations of the material are needed to reduce the g-forces by 10–50 times. With the invention, the g-force acting on the sensor element proper may be reduced from 5000 g to some 100 g.

Since the accelerometer is encased in an obviously fragile component in the present invention, there is a greater probability that the arrangement will be carefully handled (the car industry does in fact not require that light bulbs and glass components should withstand an accidental fall to the floor!).

According to the invention, the accelerometer or the sensor element is provided with basic protection against dirt (optionally dust-proof protection), a certain resistance to chemicals, as well as a basic ability to withstand excessive load owing to its inner protective casing. As a rule, the latter is obtained from the manufacturer of the accelerometer. By further providing, in accordance with the invention, the accelerometer or the sensor element with an outer protective casing, which also serves another purpose, i.e. to cover the lighting device or information transducer (e.g. the blinker or the brake lights), the outer casing will provide a deformation zone (elastic or plastic deformation), mechanical protection as well as chemical protection (against liquids and gases). There is in addition a psychological factor by the fitter becoming more careful when the component in which the sensor element is mounted appears to be fragile.

I claim:

1. A method for protecting a vehicle motion sensor from contamination and shock comprising the steps of:

enclosing the sensor with a first inner casing to produce an inner sensor assembly; and enclosing said inner sensor assembly with at least one outer casing;

wherein said at least one outer casing comprises a vehicle light casing.

2. The method of claim 1 wherein the step of enclosing said inner sensor assembly further comprises enclosing said inner sensor assembly with a headlight casing.

3. The method of claim 1 wherein the step of enclosing said inner sensor assembly further comprises enclosing said inner sensor assembly with a tail light casing.

4. A vehicle motion sensor protection apparatus, comprising:

a vehicle motion sensor for sensing the position and/or movement of a vehicle;

an inner casing surrounding the sensor for protecting the sensor against at least contamination; and at least one outer casing surrounding the sensor and inner casing for protecting the sensor against at least shock; wherein said at least one outer casing comprises a vehicle light casing.

5. The vehicle motion sensor protection apparatus of claim 4 wherein said vehicle light casing comprises a headlight casing.

6. The vehicle motion sensor protection apparatus of claim 4 wherein said vehicle light casing comprises a tail light casing.

7. The vehicle motion sensor protection apparatus of claim 4 wherein said vehicle motion sensor comprises an accelerometer.

* * * * *